3,261,857
NOVEL ORGANOPHOSPHORUS COMPOUNDS

Michael McKay Rauhut, Norwalk, Conn., assignor to American Cyanamid Company, Stamford, Conn., a corporation of Maine
No Drawing. Filed Apr. 8, 1965, Ser. No. 446,739
6 Claims. (Cl. 260—429.9)

This application is a continuation-in-part application of copending U.S. application Serial No. 235,824, filed November 6, 1962.

The present invention relates to new and useful organophosphorus compounds and to the preparation thereof. More particularly, the instant discovery concerns secondary dithiophosphinic acids, their salts and esters.

According to the present invention a secondary phosphine is reacted with sulfur, water, and a base reagent, such as ammonium hydroxide, to produce the salt of the corresponding secondary dithiophosphinic acid, such as the ammonium salt thereof. The following equations are illustrative of specific embodiments of the present invention:

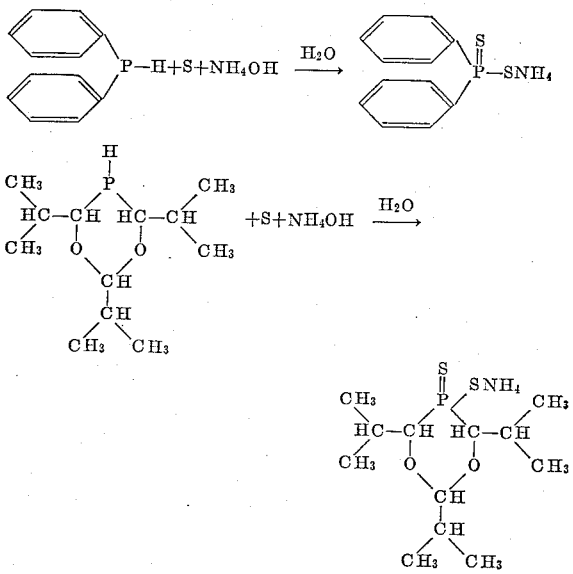

These salts may, in turn, be converted to their corresponding acids, esters, and other salts, as will be seen hereinafter.

Generically, the products of the present invention may be written as follows:

$$X\text{—}SY$$

wherein X is selected from

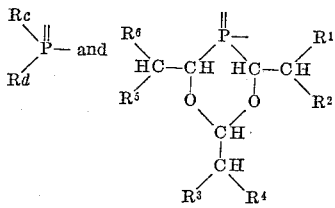

wherein Y represents hydrogen; ammonium; lithium, potassium, and sodium; an alkaline earth metal including calcium, strontium, and barium, and the like; a heavy metal, such as copper, mercury, nickel, zinc and the like; other metals, such as aluminum, magnesium, and the like; a substituted and unsubstituted, saturated and unsaturated, branched and straight chain alkyl radical having from 1 to 18 carbon atoms; a substituted and unsubstituted, saturated and unsaturated alicyclic radical; a substituted and unsubstituted aryl radical. $Rc$ and $Rd$, respectively, of the above represent substituted and unsubstituted, saturated and unsaturated, branched and straight chain alkyl having from 1 to 18 carbon atoms, and, preferably, said substituted alkyl radicals have their substituents on a carbon atom at least 3 carbon atoms removed from the phosphorus atom; saturated and unsaturated, substituted and unsubstituted alicyclic radicals; substituted and unsubstituted aryl radicals; and $Rc$ and $Rd$, respectively, are attached directly to the phosphorus atom through a carbon atom. $Rc$ and $Rd$ may be the same or different radicals.

$R^1$ to $R^6$ in the above formula each represent alkyl of 1 to 10 carbon atoms and, as will be seen hereinafter, $R^1$, $R^2$, $R^3$, $R^4$, $R^5$ and $R^6$ may be the same or different radicals.

Generally, the salt of the dithiophosphinic acid corresponding to the secondary phosphine reactant is first formed and is then converted to its corresponding acid or ester. Typically, 2,4,6-triisopropyl-1,3,-dioxa-5-phosphacyclohexane is reacted with aqueous ammonium hydroxide and sulfur to produce the ammonium salt of 2,4,6 - triisopropyl-1,3-dioxa-5-phosphacyclohexane-5-dithioic acid, which, in turn, is dissolved in water and acidified with HCl to yield 2,4,6-triisopropyl-1,3-dioxa-5-phosphacyclohexane-5-dithioic acid.

The metal salt of this acid may be prepared by reacting the acid with an alkali metal hydroxide, for example, such as NaOH. In turn, this metal salt, such as the sodium salt, is reacted with a halogen-substituted alkyl or alicyclic compound to produce the corresponding ester, as will be seen hereinafter. These esters are produced at reaction temperatures in the range of 50° C. to 75° C., or at temperatures up to about the reflux temperature of any solvent employed.

Typical halogen substituted compounds suitable for preparing these esters are 1-chloropropane, 3-chlorohexane 1-bromobutene-2, 1-chloro-3-ethoxy-heptane, 1-bromo cyclohexane-2, and the like.

Another route to the esters involves reacting the free acids of the present invention with alcohols or olefins to produce corresponding esters.

Typical secondary phosphines corresponding to the formulae

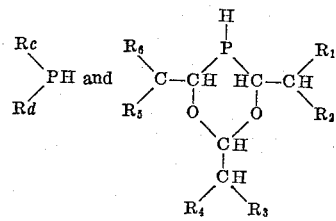

and useful for preparing the products of the present invention are:

Diphenylphosphine;
Bis(4-chlorophenyl)phosphine;
Dibutylphosphine;
Didodecylphosphine;
Bis(2-phenylethyl)phosphine;
Dicyclohexylphosphine;
Bis(3-ethylhexyl)phosphine;
Bis(2,4,4-trimethylpentyl)phosphine;
Bis(3-chloropropyl)phosphine;
Bis(2-butenyl)phosphine;
Ethylhexylphosphine;
Dioctylphosphine;
Diisooctylphosphine;
Bis(3-methoxycyclohexyl)phosphine;
Bis(3-ethoxycyclopentenyl)phosphine;
2,4,6-tris(3-heptyl)-1,3-dioxa-5-phosphacyclohexane;

2-(3-hexyl)-4,6-diisopropyl-1,3-dioxa-5-phosphacyclohexane;
Bis(2-phenoxyethyl)phosphine;
Bis(2-aminoethyl)phosphine;
Bis(2-nitropropyl)phosphine;
Bis(2-sulfoethyl)phosphine;
Bis(carbamylmethyl)phosphine;
Bis(2-ureidoethyl)phosphine;
Bis(hydroxymethyl)phosphine;
Bis(1-hydroxyhexyl)phosphine;
Bis(3-carboxypropyl)phosphine;
Bis(3-carbethoxypropyl)phosphine;
Bis(4-aminophenyl)phosphine;
Bis[2(4-aminophenyl)ethyl]phosphine;
and the like; and mixtures thereof, such as a reactant mixture of dioctylphosphine and diisooctylphosphine, and similar mixtures.

The 2,4,6 - trisecondaryalkyl-1,3-dioxa-5-phosphacyclohexanes contemplated herein are prepared as described in copending U.S. application Serial No. 766,656, filed October 13, 1958, now U.S. Patent 2,984,683, which is incorporated herein by reference. The 2,4,6-triisopropyl-1,3-dioxa-5-phosphacyclohexane referred to above, for example, is prepared as shown in Examples A through C, below.

Among the basic organic and inorganic reagents suitable for the present invention are alkali hydroxides, including sodium, potassium and lithium; alkali carbonates, such as sodium carbonate; alkaline earth hydroxides, such as the hydroxides of barium, magnesium, strontium, and calcium; weak bases, such as ammonium hydroxide, basic organic amine, such as pyridine, cyclohexylamine, aniline, primary alkyl ($C_1$-$C_{16}$) amine, secondary alkyl ($C_1$-$C_{12}$) amine, tertiary alkyl ($C_1$-$C_{12}$) amine, piperidine, 2-hydroxyethylamine, bis(2-hydroxyethyl)amine and tris(2-hydroxyethyl)amine.

If desired the reaction of a secondary phosphine, according to the instant discovery, with sulfur, water, and a basic reagent may be carried out in the presence of a water-soluble, inert, organic solvent in which the basic reagent is soluble. Included among these solvents are lower aliphatic alcohols; cyclic ethers, such as tetrahydrofuran and dioxane; methyl ethyl ketone; and the like.

The reaction of the present invention wherein a secondary phosphine is brought into intimate contact with sulfur, water, and a base reagent is best carried out, according to the instant discovery, at temperatures in the range of 0° C. to 100° C., preferably 15° C. to 75° C. As will be seen hereinafter, the ammonium salt thus prepared may be reacted with an acid, such as HCl, dilute sulfuric acid, or methane sulfonic acid to produce the secondary dithiophosphinic acid. These reactions generally are made to take place at temperatures in the range of −30° C. to 75° C., preferably 10° C. to 50° C.

While atmospheric pressures are desirable for this type of reaction, super- and sub-atmospheric pressures are suitable.

The reactants in the various reactions contemplated herein are generally present in stoichiometric quantities, although substantially greater or substantially less than stoichiometric amounts are suitable without upsetting the nature of the reaction.

The products of the present invention are useful as oil additives and herbicides. It is found that the water-soluble compounds are effective herbicides, whereas the water insoluble salts of the phosphacyclohexane derivatives of the present invention are effective additives which enhance the lubricity of oil.

Included among the substitutents contemplated for $Rc$ and $Rd$, respectively, in the formula given above are alkoxy, halogen, aryloxy, aralkoxy, alkaryloxy, amino, nitro, ureido, sulfo, hydroxyl, carbamyl, acyloxy, carbalkoxy, carboxy, aryl, and the like.

The following examples illustrate methods of preparing typical 2,4,6-trisecondaryalkyl-1,3-dioxa-5-phosphacyclohexane secondary phosphines of the type contemplated herein:

EXAMPLE A

*2,4,6-triisopropyl-1,3-dioxa-5-phosphacyclohexane*

A one-liter, three-necked reactor flask is equipped with a gas inlet tube, an addition funnel, a mechanical stirrer and a gas bubbler device so disposed that all exit gases from the flask pass upwardly therethrough, the bubbler device comprising a column containing a two-inch head of water. The reactor flask is charged with a solution mixture at ambient temperature (21° C.–23° C.) of 200 milliliters of a concentrated aqueous solution of hydrochloric acid containing 37.7 percent HCl by weight and 200 milliliters of tetrahydrofuran.

Subsequently, the flask system and the charge are purged substantially free of oxygen-containing gas with nitrogen gas, and then a total of 108 grams (1.5 moles) of isobutyraldehyde and 17 grams (0.5 mole) of gaseous phosphine, at ambient temperature (21° C.–23° C.), is slowly and continuously introduced into the charge over a period of 30 minutes.

A reaction mixture results which, after settling for 30 minutes, leaves an upper organic layer or phase which is separated from the remaining reaction mixture and distilled under reduced pressure. A total of 91 grams (78 percent of theory) of product 2,4,6-triisopropyl-1,3-dioxa-5-phosphacyclohexane is thus collected as a colorless liquid having a boiling point of 100° C.–101° C. at 8 millimeters pressure. The material has a pungent odor and a refractive index of $n_D^{25} = 1.4602$.

*Analysis.*—Calculated for $C_{12}H_{25}O_2P$: C, 62.04; H, 10.85; P, 13.34. Found: C, 61.82; H, 10.78; P, 13.26.

EXAMPLE B

*2,4,6-tris(3-heptyl)-1,3-dioxa-5-phosphacyclohexane*

The reactor flask in Example A is charged instead with a mixture of 125 milliliters of a concentrated aqueous solution of hydrochloric acid containing 37.7 percent HCl by weight and 125 milliliters of tetrahydrofuran, and a total of 66.5 grams (0.52 mole) of 2-ethylhexandehyde and 6.2 grams (0.18 mole) of phosphine at ambient temperature (21° C.–23° C.) is added uniformly with agitation in the course of 30 minutes. A reaction mixture results having an upper organic phase which is separated from the remaining reaction mixture and distilled under reduced pressure. A total of 61.1 grams (90 percent of theory) of 2,4,6-tris(3-heptyl)-1,3-dioxa-5-phosphacyclohexane as a colorless liquid product is recovered having a boiling point of 148° C. to 153° C. at 0.025 millimeter pressure and having a refractive index of $n_D^{24} = 1.4709$.

*Analysis.*—Calculated for $C_{24}H_{29}O_2P$: C, 71.95; H, 12.33; P, 7.73. Found: C, 71.87; H, 12.62; P, 7.57.

EXAMPLE C

In lieu of ethylhexaldehyde in Example B, above, 2-ethylbutyraldehyde, 2-methyloctadecylaldehyde, 2-propylpentaldehyde, 2-methylheptaldehyde, or 2-ethylundecaldehyde, for example, is substituted and the corresponding 2,4,6-trisecondaryalkyl-1,3-dioxa-5-phosphacyclohexane is recovered. The reactants (A) of Table I, infra, are typical.

EXAMPLE I

*2,4,6-triisopropyl-1,3-dioxa-5-phosphacyclohexane-5-dithioic acid*

A mixture of 235 grams (1.0 mole) of 2,4,6-triisopropyl - 1,3 - dioxa-5-phosphacyclohexane, 64 grams (2.0 moles) of sulfur, 350 milliliters of concentrated ammonium hydroxide solution, and 350 milliliters of water is heated at 85° C. in an atmosphere of nitrogen for 1 hour. The resulting colorless solution is filtered while still warm to remove a small excess of sulfur and then cooled to 0° C. in an ice bath. The product recovered is 265 grams (85 percent by weight of theory) of the ammonium salt of 2,4,6-triisopropyl-1,3-dioxa-5-phosphacyclohexane-5-dithioic acid which crystallizes on standing. Two recrystallizations of this product from a benzene-acetone mixture give an analytical sample melting at about 185° C. with decomposition. The melting point depends on the rate of heating.

*Analysis.*—Calculated for: $C_{12}H_{28}NO_2PS_2$: C, 45.98; H, 9.00; P, 9.88. Found: C, 46.21; H, 8.99; P, 9.78, 9.99.

A portion of this ammonium salt product is dissolved in water, and the resulting solution acidified with hydrochloric acid. An oil separates out and crystallizes on standing to yield the corresponding 2,4,6-triisopropyl-1,3-dioxa-5-phosphacyclohexane-5-dithioic acid having a melting point of 48° C.–51° C.

*Analysis.*—Calculated for $C_{12}H_{25}O_2PS_2$: C, 48.62; P, 10.45; S, 21.63. Found: C, 48.85; P, 10.56; S, 21.48.

EXAMPLE II

*Sodium salt of 2,4,6-triisopropyl-1,3-dioxa-5-phosphacyclohexane-5-dithioic acid*

A stirred mixture of 23.5 grams (0.1 mole) of 2,4,6-triisopropyl-1,3-dioxa-5-phosphacyclohexane, 6.4 grams (0.2 mole) of sulfur, 4.0 grams (0.1 mole) of sodium hydroxide, and 70 milliliters of water is heated at 75° C. in an atmosphere of nitrogen for 1 hour. The resulting clear solution is evaporated to dryness and a crystalline residue is formed which is extracted with acetone. The acetone extract is evaporated to dryness and the residue obtained recrystallized from a benzene-acetone mixture to obtain the sodium salt of 2,4,6-triisopropyl-1,3-dioxa-5-phosphacyclohexane-5-dithioic acid having a melting point of 283° C.–285° C.

EXAMPLE III

*Sodium salt of diphenyldithiophosphinic acid*

Example I, above, is repeated with the exception that 1 mole of diphenylphosphine is used as the secondary phosphine reactant. The corresponding diphenyldithiophosphinic acid is obtained and has a melting point of 52° C.–55° C. By exactly neutralizing this free acid with a dilute sodium hydroxide solution, the corresponding sodium salt thereof is produced.

EXAMPLE IV

*Sodium salt of bis(4-chlorophenyl)dithiophosphinic acid*

Example I, above, is repeated with the exception that 1 mole of bis(4-chlorophenyl)phosphine is used as the secondary phosphine. The corresponding bis(4-chlorophenyl)dithiophosphinic acid is obtained. By exactly neutralizing this free acid with a dilute sodium hydroxide solution, the corresponding sodium salt thereof is produced.

EXAMPLE V

*Ammonium salt of dibutyldithiophosphinic acid*

Dibutylphosphine (14.6 grams, 0.1 mole) is added dropwise with stirring to a mixture of 7.0 grams (0.22 mole) of sulfur, 50 milliliters of ammonium hydroxide, and 50 milliliters of water in an atmosphere of nitrogen. During the addition, which takes 10 minutes, an exothermic reaction occurs and the temperature is maintained at 25° C.–27° C. by intermittent cooling. This reaction mixture is stirred at about room temperature (21° C.–23° C.) for 1.5 hours. The excess sulfur present at the end of this period is filtered off and the filtrate evaporated to dryness, thus recovering the ammonium salt of dibutyldithiophosphinic acid having a melting point of 82° C.–88° C. Two recrystallizations of this salt from benzene provide 16.8 grams of analytically pure product having a melting point of 97° C.–99° C.

EXAMPLE VI

*Nickel salt of dibutyldithiophosphinic acid*

Example V, above, is repeated with the exception that the solution obtained after removing excess sulfur is combined with a solution of 12 grams (0.05 mole) of nickel (II) chloride hexahydrate in 20 milliliters of water. The resulting mixture is extracted with three 50-milliliter portions of ether. A dark blue ether solution is obtained which is dried over anhydrous sodium sulfate and evaporated to give blue needles having a melting point of 83° C.–86° C. Recrystallization from methanol provides an analytical sample of the nickel salt of dibutyldithiophosphinic acid having a melting point of 89° C.–90° C.

EXAMPLE VII

*Nickel salt of didodecyldithiophosphinic acid*

Two grams (0.005 mole) of didodecylphosphine, 0.39 gram (0.012 mole) of sulfur, 10 milliliters of water, 10 milliliters of ammonium hydroxide, and 20 milliliters of methanol are combined and stirred at 60° C. in an atmosphere of nitrogen for 20 minutes. At the end of this period the excess sulfur remaining is filtered off and the filtrate thus obtained is concentrated under reduced pressure to obtain ammonium didodecyldithiosphinate. This ammonium salt is combined with 20 milliliters of water and 3 milliliters of methanol and added to a solution of 1 gram of nickel (II) chloride hexahydrate in 10 milliliters of water. A blue solid separates out which is extracted with three 35-milliliter portions of ether. The resulting dark blue ether solution is concentrated under reduced pressure and cooled to obtain 1.7 grams of blue crystals melting at 72° C.–74° C. Recrystallization from a benzene-methanol solution provides 1.6 grams of the nickel salt of didodecyldithiophosphinic acid having a melting point of 72° C.–73° C.

EXAMPLE VIII

*Ammonium salt of bis(2-phenylethyl)dithiophosphinic acid*

Bis(2-phenylethyl)phosphine (9.5 grams, 0.04 mole) is added dropwise to a stirred mixture of 2.75 grams (0.086 mole) of sulfur, 20 milliliters of ammonium hydroxide, and 20 milliliters of water in an atmosphere of nitrogen. During the addition, which takes ten minutes, an exothermic reaction occurs and the temperature is maintained at 25° C.–30° C. by intermittent cooling. The reaction mixture is then stirred at about room temperature (21° C.–23° C.) for 3 hours. The excess sulfur present at the end of this period is filtered off and the filtrate evaporated to dryness, thus recovering the ammonium salt of bis(2-phenylethyl)dithiophosphinic acid having a melting point of 195° C.–203° C. Two recrystallizations from a benzene-methanol solution raise the melting point to 201° C.–203° C.

EXAMPLE IX

*Nickel salt of bis(2-phenylethyl)dithiophosphinic acid*

Example VIII, above, is repeated with the exception that the solution, after removing excess sulfur, is combined with a solution of 5 grams (0.02 mole) of nickel (II) chloride hexahydrate in 25 milliliters of water. The resulting green solid, having a melting point of 141° C.–145° C., is filtered off. Recrystallization thereof from a benzene-petroleum ether solution provides an analytical sample of the nickel salt of bis(2-phenylethyl)dithiophosphinic acid having a melting point of 146° C.–148° C.

EXAMPLE X

*Ammonium salt of dicyclohexyldithiophosphinic acid*

A stirred mixture of 9.9 gram (0.05 mole) of dicyclohexylphosphine, 3.5 grams (0.11 mole) of sulfur, 25 milliliters of ammonium hydroxide, 25 milliliters of water, and 20 milliliters of methanol is heated at 60° C. in an atmosphere of nitrogen for 1 hour. The resulting yellow solution is filtered to remove excess sulfur and concentrated under reduced pressure. The ammonium salt of dicyclohexyldithiophosphinic acid separates out upon standing as a white crystalline material having a melting point of 185° C.–193° C. Recrystallization from benzene containing a little methanol raises the melting point to 191° C.–195° C.

EXAMPLE XI

*Nickel salt of dicyclohexyldithiophosphinic acid*

Example X, above, is repeated with the exception that the solution, after removing excess sulfur, is combined with a solution of 6 grams (0.025 mole) of nickel (II) chloride hexahydrate in 25 milliliters of water. The resulting blue solid, having a melting point of 280° C.–282° C., is filtered off. Recrystallization from benzene provides an analytical sample of the nickel salt of dicyclohexyldithiophosphinic acid having a melting point of 281° C.–284° C.

EXAMPLE XII

*2,4-dinitrophenyl diphenyldithiophosphinate*

The sodium salt of diphenyldithiophosphinic acid prepared as in Example III, above, is reacted with an equimolar amount of 1-chloro-2,4-dinitrobenzene in methyl isobutyl ketone by refluxing the solution mixture for 1 hour under anhydrous conditions. The resulting reaction mixture is cooled to room temperature (21° C.–23° C.) and sodium chloride removed therefrom by filtration. The filtrate is evaporated to dryness under reduced pressure to obtain product 2,4-dinitrophenyl diphenyldithiophosphinate as a solid soluble in benzene, acetonitrile or acetone.

EXAMPLE XIII

*Cyclopentyl 2,4,6-triisopropyl-1,3-dioxa-5-phosphacyclohexane-5-dithioate*

An equimolar mixture of the sodium salt of 2,4,6-triisopropyl-1,3-dioxa-5-phosphacyclohexane-5-dithioic acid (prepared as in Example II, above) and cyclopentylbromide in methyl isobutyl ketone is refluxed for 3 hours under anhydrous conditions. The resulting reaction mixture is cooled to room temperature (21° C.–23° C.) and sodium bromide removed therefrom by filtration. The filtrate is evaporated to dryness under reduced pressure to obtain the product cyclopentyl 2,4,6-triisopropyl-1,3-dioxa-5-phosphacyclohexane-5-dithioate.

TABLE I

| Example No. | 2,4,6-trialkyl-1,3-dioxa-5-phosphacyclohexane (A) | +S (B) | +H$_2$O | +Base Reagent (C) | Temp., °C. | Ratio, A:B:C | Process as in Example | Product Salt (D) |
|---|---|---|---|---|---|---|---|---|
| XIV | 2,4,6-tri(3-heptyl)1,3-dioxa-5-phosphacyclohexane. | S | H$_2$O | Ba(OH)$_2$ | 75 | 1:2:1 | II | Barium 2,4,6-tri(3-heptyl)-1,3-dioxa-5-phosphacyclohexane-5-dithioate. |
| XV | 2,4,6-tri(3-pentyl)1,3-dioxa-5-phosphacyclohexane. | S | H$_2$O | Ca(OH)$_2$ | 70 | 1:2:1 | II | Calcium 2,4,6-tri(3-pentyl)-1,3-dioxa-5-phosphacyclohexane-5-dithioate. |
| XVI | 2,4,6-tri(4-heptyl)1,3-dioxa-5-phosphacyclohexane. | S | H$_2$O | Mg(OH)$_2$ | 65 | 1:2:1 | II | Magnesium 2,4,6-tri(4-heptyl)-1,3-dioxa-5-phosphacyclohexane-5-dithioate. |
| XVII | 2,4,6-tri(3-dodecyl)1,3-dioxa-5-phosphacyclohexane. | S | H$_2$O | KOH | 60 | 1:2:1 | II | Potassium 2,4,6-tri(3-dodecyl)1,3-dioxa-5-phosphacyclohexane-5-dithioate. |
| XVIII | 2,4,6-tri(2-octyl)1,3-dioxa-5-phosphacyclohexane. | S | H$_2$O | LiOH | 75 | 1:2:1 | II | Lithium 2,4,6-tri(2-octyl)-1,3-dioxa-5-phosphacyclohexane-5-dithioate. |

TABLE II[1]

| Example No. | Reactant Salt (A) | H$_2$O | Metal Salt (B) | Temp., °C. | Product Salt (C) |
|---|---|---|---|---|---|
| XIX | Ammonium 2,4,6-triisopropyl-1,3-dioxa-5-phosphacyclohexane-5-dithioate. | H$_2$O | Zinc chloride | 20 | Zinc 2,4,6-triisopropyl-1,3-dioxa-5-phosphacyclohexane-5-dithioate. |
| XX | ----do---- | H$_2$O | Copper sulfate | 23 | Copper 2,4,6-triisopropyl-1,3-dioxa-5-phosphacyclohexane-5-dithioate. |
| XXI | ----do---- | H$_2$O | Aluminum chloride hexahydrate | 25 | Aluminum 2,4,6-triisopropyl-1,3-dioxa-5-phosphacyclohexane-5-dithioate. |
| XXII | ----do---- | H$_2$O | Mercuric nitrate | 21 | Mercuric 2,4,6-triisopropyl-1,3-dioxa-5-phosphacyclohexane-5-dithioate. |

[1] The reactions in this table are carried out at the ambient temperatures indicated by intermingling at least one equivalent of the metal salt (B) per mole of reactant (A) in the presence of H$_2$O. Resulting product (C) is recovered by removing the water after reaction takes place.

TABLE III

| Example No. | Reactant (A) | Reactant (B) | Process as in Example | Product Ester (C) |
|---|---|---|---|---|
| XXIII | Sodium 2,4,6-triisopropyl-1,3-dioxa-5-phosphacyclohexane-5-dithioate. | 3-chlorohexane | XIII | 3-hexyl 2,4,6-triisopropyl-1,3-dioxa-5-phosphacyclohexane-5-dithioate. |
| XXIV | Ammonium 2,4,6-tri(3-heptyl)1,3-dioxa-5-phosphacyclohexane-5-dithioate. | 1-bromobutene-2 | XIII | 2-butene 2,4,6-tri(3-heptyl)1,3-dioxa-5-phosphacyclohexane-5-dithioate. |
| XXV | Ammonium 2,4,6-tri(3-pentyl)1,3-dioxa-5-phosphacyclohexane-5-dithioate. | Allyl chloride | XIII | Allyl 2,4,6-tri(3-pentyl)1,3-dioxa-5-phosphacyclohexane-5-dithioate. |
| XXVI | Sodium 2,4,6-tri(4-heptyl)1,3-dioxa-5-phosphacyclohexane-5-dithioate. | 2-dodecenylchloride | XIII | 2-dodecenyl 2,4,6-tri(4-heptyl)1,3-dioxa-5-phosphacyclohexane-5-dithioate. |
| XXVII | Ammonium 2,4,6-tri(3-dodecyl)1,3-dioxa-5-phosphacyclohexane-5-dithioate. | p-Nitrochlorobenzene | XIII | p-Nitrophenyl 2,4,6-tri(3-dodecyl)1,3-dioxa-5-phosphacyclohexane-5-dithioate. |
| XXVIII | Sodium 2,4,6-tri(2-octyl)1,3-dioxa-5-phosphacyclohexane-5-dithioate. | Cyclohexylchloride | XIII | Cyclohexyl 2,4,6-tri(2-octyl)-1,3-dioxa-5-phosphacyclohexane-5-dithioate. |
| XXIX | Ammonium 2,4,6-triisopropyl-1,3-dioxa-5-phosphacyclohexane-5-dithioate. | Octadecylchloride | XIII | Octadecyl 2,4,6-triisopropyl-1,3-dioxa-5-phosphacyclohexane-5-dithioate. |
| XXX | Ammonium 2,4,6-tri(3-heptyl)1,3-dioxa-5-phosphacyclohexane-5-dithioate. | Benzylchloride | XIII | Benzyl 2,4,6-tri(3-heptyl)1,3-dioxa-5-phosphacyclohexane-5-dithioate. |

EXAMPLE XXXI

Example V, supra, is repeated in every essential respect with the exception that (a) dibutyl phosphine and (b) ammonium hydroxide, respectively are substituted with one of the following (A) secondary phosphines and (B) base reagents:

(A) SECONDARY PHOSPHINES (1) Bis(3-ethylhexyl)phosphine
(2) Bis(2,4,4-trimethylpentyl)phosphine
(3) Bis(3-chloropropyl)phosphine
(4) Bis(2-butenyl)phosphine
(5) Ethylhexylphosphine
(6) Diisooctylphosphine
(7) Bis(3-methoxycyclohexyl)phosphine
(8) Bis(3-ethoxycyclopentenyl)phosphine
(9) Bis(2-phenoxyethyl)phosphine
(10) Bis(2-aminoethyl)phosphine
(11) Bis(2-nitropropyl)phosphine
(12) Bis(2-sulfoethyl)phosphine
(13) Bis(carbamylmethyl)phosphine
(14) Bis(2-ureidoethyl)phosphine
(15) Bis(hydroxymethyl)phosphine
(16) Bis(1-hydroxyhexyl)phosphine
(17) Bis(3-carboxypropyl)phosphine
(18) Bis(3-carbethoxypropyl)phosphine
(19) Bis(4-aminophenyl)phosphine
(20) Bis[2(4-aminophenyl)ethyl]phosphine

(B) BASE REAGENTS (1) Methylamine
(2) Butylamine
(3) Octylamine
(4) Dodecylamine
(5) Stearylamine
(6) Diisopropylamine
(7) Dihexylamine
(8) Didodecylamine
(9) Dimethylamine
(10) Trimethylamine
(11) Tripentylamine
(12) Tridecylamine
(13) Tridodecylamine
(14) Pyridine
(15) Aniline
(16) Piperidine
(17) 2-hydroxyethylamine
(18) Bis(2-hydroxyethyl)amine
(19) Tris(2-hydroxyethyl)amine
(20) Cyclohexylamine The corresponding (C) organic salts of disubstituted dithiophosphinic acid recovered are as follows:

(C) ORGANIC SALTS (1) Methylammonium bis(3-ethylhexyl)dithiophosphinate
(2) Butylammonium bis(2,4,4-trimethylpentyl)-dithiophosphinate
(3) Octylammonium bis(3-chloropropyl)dithiophosphinate
(4) Dodecylammonium bis(2-butenyl)dithiophosphinate
(5) Stearylammonium ethylhexyldithiophosphinate
(6) Diisopropylammonium diisooctyldithiophosphinate
(7) Dihexylammonium bis(3-methoxycyclohexyl)dithiophosphinate
(8) Didodecylammonium bis(3-ethoxycyclopentenyl)dithiophosphinate
(9) Dimethylammonium bis(2-phenoxyethyl)dithiophosphinate
(10) Trimethylammonium bis(2-aminoethyl)dithiophosphinate
(11) Tripentylammonium bis(2-nitropropyl)dithiophosphinate
(12) Tridecylammonium bis(2-sulfoethyl)dithiophosphinate
(13) Tridodecylammonium bis(carbamylmethyl)dithiophosphinate
(14) Pyridinium bis(2-ureidoethyl)dithiophosphinate
(15) Anilinium bis(hydroxymethyl)dithiophosphinate
(16) Piperidinium bis(1-hydroxyhexyl)dithiophosphinate
(17) 2-hydroxyethylammonium bis(3-carboxypropyl)-dithiophosphinate
(18) Bis(2-hydroxyethylammonium)bis(3-carbethoxypropyl)dithiophosphinate
(19) Tris(2-hydroxyethyl)ammonium bis(4-aminophenyl)dithiophosphinate
(20) Cyclohexylammonium bis[2(4-aminophenyl)-ethyl]dithiophosphinate The following examples will serve to illustrate the utilities of typical compounds of the invention.

EXAMPLE XXXII

Herbicidal activity is exemplified by initially dissolving test compound: 2,4,6-triisopropyl - 1,3 - dioxa-5-phosphacyclohexane-5-dithioic acid in 50/50 acetone/water mixture in sufficient quantity to provide the equivalent of 3 pounds per acre. The solution is sprayed on radish, tomato and pea plants at a pressure of 30 p.s.i. and, after spraying, the plants are placed on greenhouse benches and cared for in the usual manner. Two to four weeks after spraying, all plants are examined.

It is found that 100% kill of the radish and tomato plants occurred, whereas 95% kill of the pea plants is noted.

Similar herbicidal activity is observed when either the ammonium or sodium salt of 2,4,6-triisopropyl-1,3-dioxa-5-phosphacyclohexane-5-dithioic acid is substituted for the dithioic acid per se.

EXAMPLE XXXIII

This example illustrates the effectiveness of nickel and zinc salts of 2,4,6-triisopropyl-1,3-dioxa-5-phosphacyclohexane-5-dithioic acid as illustrative water-insoluble compounds for anti-wear or extreme-pressure lubricants.

The basic fluids for demonstrating this effect are Fractol A (a mineral oil) and DOS (i.e., di(2-ethylhexyl)sebacate), a typical diester type synthetic lubricant. Solutions containing the test additive in each of the base fluids are tested using the 4-Ball wear tester. The latter consists of four $1'' \pm 0.001''$ high carbon chrome alloy steel balls (grade 1000) arranged in the form of an equilateral tetrahedron. The three lower balls are held immovable in a cup and they form a cradle in which the upper ball is placed. The upper ball is held in a drill chuck which is caused to rotate about a vertical axis under specific conditions of load and speed. The cup containing the three lower balls is filled with the lubricant to be tested such that the balls are completely covered. During the test circular or near-circular scars are worn on the surface of the three stationary balls. The average diameter of the scars is a measure of wear which depends on the load, speed, time of test and specific lubricant present. By holding all other variables constant, the lubrication properties of various fluids can be tested.

Lubricity tests are performed in the above-described 4-ball wear machine by testing both the nickel and zinc salts of the dithioic acids as indicated in the Table IV below as $NiA_2$ and $ZnA_2$, respectively. With a load of 28.7 kilograms, a speed of 390 r.p.m. and a time of sixty minutes, the results are set forth in the table.

TABLE IV.—LUBRICITY TEST DATA

| Base Fluid | $NiA_2$ Level (weight percent) | $ZnA_2$ (weight percent) | Wear Scar (mm.) | Temp. Rise (° C.) |
|---|---|---|---|---|
| Fractol A | 0 | 0 | 0.6 | 8 |
| Do | 0.1 | 0.2 | 0.3 | 6 |
| DOS | 0 | 0 | 0.6 | 8.5 |
| DOS | 0.25 | 0.3 | 0.2 | 7.5 |

It will be seen from the summarized data that the coefficient of friction of DOS+0.25% $NiA_2$ or 0.3% $ZnA_2$ as determined by measuring the torque on the cup is approximately one-half that of the untreated DOS.

During the testing, a reduction of frictional squeal to almost zero is noted when either $NiA_2$ or $ZnA_2$ is added to the base fluid. It is understood that by definition $NiA_2$ is the nickel salt of 2,4,6-triisopropyl-1,3-dioxa-5-phosphacyclohexane-5-dithioic acid and $ZnA_2$ is the zinc salt of 2,4,6-triisopropyl - 1,3 - dioxa-5-phosphacyclohexane-5-dithioic acid.

I claim:

1. An organophosphorus compound corresponding to the formula

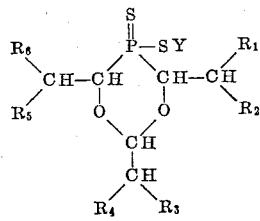

wherein Y represents a member selected from the group consisting of hydrogen; ammonium; alkali metal; alkaline earth metal; copper; mercury; zinc; nickel; aluminum; alkyl; alkenyl; cyclopentyl; cyclohexyl; benzyl; nitrophenyl; and $R_1$ and $R_6$ each represents alkyl having from 1 to 10 carbon atoms.

2. 2,4,6 - triisopropyl - 1,3 - dioxa - 5 - phosphacyclohexane-5-dithioic acid.

3. The ammonium salt of 2,4,6-triisopropyl-1,3-dioxa-5-phosphacyclohexane-5-dithioic acid.

4. The sodium salt of 2,4,6-triisopropyl - 1,3 - dioxa-5-phosphacyclohexane-5-dithioic acid.

5. The nickel salt of 2,4,6-triisopropyl-1,3-dioxa-5-phosphacyclohexane-5-dithioic acid.

6. The zinc salt of 2,4,6-triisopropyl-1,3-dioxa-5-phosphacyclohexane-5-dithioic acid.

No references cited.

TOBIAS E. LEVOW, *Primary Examiner.*

H. M. S. SNEED, *Assistant Examiner.*